(12) United States Patent
Ha

(10) Patent No.: US 9,448,550 B2
(45) Date of Patent: Sep. 20, 2016

(54) ENERGY MANAGEMENT IN A BUILDING

(75) Inventor: Duy Long Ha, Eybens (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 744 days.

(21) Appl. No.: 13/387,012

(22) PCT Filed: Jul. 27, 2010

(86) PCT No.: PCT/EP2010/060864
§ 371 (c)(1),
(2), (4) Date: Mar. 2, 2012

(87) PCT Pub. No.: WO2011/012607
PCT Pub. Date: Feb. 3, 2011

(65) Prior Publication Data
US 2012/0179298 A1 Jul. 12, 2012

(30) Foreign Application Priority Data
Jul. 30, 2009 (FR) ...................................... 09 55332

(51) Int. Cl.
*G05B 21/00* (2006.01)
*G05B 19/042* (2006.01)

(52) U.S. Cl.
CPC ..... *G05B 19/042* (2013.01); *G05B 2219/2642* (2013.01)

(58) Field of Classification Search
CPC ................... G06Q 10/06312; G05D 23/1931; G05D 23/1932; F25D 21/006; F25D 2500/04; F25D 2700/12; F25D 2700/16; F25D 29/00; G01N 17/00; G01N 2291/0258; G01N 2291/044; G01N 2291/101; G01N 25/18

USPC .................... 700/17, 19, 286, 291, 295, 297
See application file for complete search history.

(56) References Cited

U.S. PATENT DOCUMENTS

| 5,761,083 A | 6/1998 | Brown, Jr. et al. |
| 1,967,923 A1 | 9/2008 | Schoettle |
| 2006/0020353 A1 | 1/2006 | Gonzales et al. |

(Continued)

FOREIGN PATENT DOCUMENTS

| DE | 10 2004 055273 A | 5/2006 |
| EP | 1770454 A | 4/2007 |

(Continued)

OTHER PUBLICATIONS

Yang et al., "Application of artificial neural network to predict the optimal start time for heating system in building," Energy Conversion and Management 44 (2003) 2791-2809.*

(Continued)

*Primary Examiner* — Darrin Dunn
(74) *Attorney, Agent, or Firm* — Frommer Lawrence & Haug LLP

(57) ABSTRACT

Method for managing the energy of a building, comprising one or more occupants likely to be present therein, each determining a comfort desire for a given period, characterized in that it comprises a step for determining an overall comfort parameter for a given period on the basis of the comfort desire of each occupant present in the area of the building in the given period, this global comfort parameter being used to manage the energy on the basis of the comfort desires of the only occupants present in the building.

16 Claims, 4 Drawing Sheets

(56) References Cited

U.S. PATENT DOCUMENTS

| | | | |
|---|---|---|---|
| 2007/0043478 A1* | 2/2007 | Ehlers et al. | 700/276 |
| 2008/0177423 A1 | 7/2008 | Brickfield et al. | |
| 2008/0277486 A1* | 11/2008 | Seem et al. | 236/49.3 |
| 2010/0138363 A1* | 6/2010 | Batterberry et al. | 705/412 |
| 2010/0262298 A1* | 10/2010 | Johnson et al. | 700/277 |

FOREIGN PATENT DOCUMENTS

| | | |
|---|---|---|
| EP | 1 967 923 A | 9/2008 |
| JP | 2001-082782 A | 3/2001 |
| JP | 2003-042508 A | 2/2003 |
| JP | 2005-344952 A | 12/2005 |
| JP | 2006-085252 A | 3/2006 |
| JP | 2007-133469 A | 5/2007 |

OTHER PUBLICATIONS

Notice of Reasons for Rejection issued by Japanese Patent Office for corresponding Japanese application 2012-522146 mailed Feb. 12, 2014. English translation.

* cited by examiner

ENERGY MANAGEMENT IN A BUILDING

This application is a 371 of PCT/EP2010/060864 filed on Jul. 27, 2010, published on Feb. 3, 2011 under publication number WO 2011/012607, which claims priority benefits from French Patent Application Number 09/55332 filed Jul. 30, 2009, the disclosure of which is incorporated herein by reference.

The invention relates to a method for managing the energy of a building and a device for managing the energy of a building implementing such a method. Finally, it relates to a building as such implementing a management of its energy according to such a method.

The building sector represents a very large proportion of the overall energy consumed and, in the interests of good energy management, it is therefore very important to optimize the consumption in buildings. As an example, the building sector represents 40% of the overall energy consumed in France. Residences represent approximately two thirds of the building energy consumption. Furthermore, 70% of this energy is consumed by the heating and air conditioning systems.

The electrical consumption in the buildings is of an irregular nature which exhibits peaks which risk exceeding thresholds that are unacceptable to the electricity production systems, or simply exceeding the limit contractually stipulated for a certain building. To overcome such extreme situations, one known solution consists in providing automatic load shedding arrangements for certain electrical consumptions, by temporarily cutting the power supply to certain devices such as the heating system or a water heater. This solution is, however, still basic and not optimal. It does not take account of the comfort of the occupants and it does not anticipate the occurrence of such peaks.

To take account of the comfort of the occupants, one common solution relies on the installation of a thermostat which is used to input different setpoint temperatures for different time periods. These inputs are provided by the occupants themselves and are often not optimized, because they do not take good account of the inertia of the buildings, or of the demand peak issues. Furthermore, they do not generally provide an optimized synthesis of the comfort desired by a number of occupants, who may have different expectations.

Thus, a more sophisticated solution is described in the document US2008/0177423, which consists in putting in place a smart system for managing the energy within a building, based on neuron networks and artificial intelligence. Such a system operates permanently to build up a history of measurements and observations enabling it to intelligently adapt the energy behaviour of the building. In particular, the heating of the building can thus be adapted to the habits of the occupants, optimize their comfort, while seeking global reduction of the energy consumed by the elimination of unnecessary consumptions. This solution also avoids the consumption peaks according to complex and revolving load shedding rules. Such a solution presents the drawback of being costly to put in place, because it requires a device comprising a powerful computer, permanently operating, which itself consumes a significant quantity of energy: thus, this solution is not suited to buildings of small size in which the overall consumption remains relatively low.

In addition to the vital issue of the management of the heating and/or air conditioning systems within buildings, it is also essential to take into account the different costs of the different sources of electrical energy, solar or not for example, and the overall electrical consumption including all the consuming appliances of the building.

Thus, to achieve the optimum comfort of the occupants of a building while reducing the overall energy consumption and managing the consumption peaks, there is a need for a simple and optimized energy management method.

One general subject of the invention is therefore to propose a simple and optimized solution for managing the energy in a building, taking into account the comfort of the occupants.

To this end, the invention relies on a method for managing the energy of a building, comprising one or more occupants likely to be present therein, each determining a thermal comfort desire for a given period, characterized in that it comprises a step for determining an overall thermal comfort parameter which comprises the determination of an overall thermal sensation value $Si(k)$ for a given period $(k)$ on the basis of the thermal comfort desire of each occupant present in the area of the building in the given period, this global thermal comfort parameter being used to manage the energy on the basis of the comfort desires of the only occupants present in the building.

The invention is more particularly defined by the claims.

These objects, features and advantages of the present invention will be explained in detail in the following description of particular embodiments given as nonlimiting examples in relation to the appended figures in which:

FIG. 1 schematically represents the method for managing the energy of a building according to one embodiment of the invention.

The invention relies on the concept of automatically taking into account the overall occupancy of the building, for example on the basis of the electronic diary of the potential occupants.

The advantageous embodiment described hereinbelow uses the product of the global occupancy parameter by the thermal comfort parameter to obtain an optimization of the comfort of the occupants of the building while minimizing the energy consumed, by taking into account the occupancy of the building. It takes account of the balances of energy produced and consumed globally and anticipates these energy behaviours by optimized provisional calculations. Finally, it makes it possible to minimize the environmental impact.

According to the advantageous embodiment of the invention, the method for managing the energy within a given building will first of all define a breakdown in the space into I areas of the building, each area being able to correspond to a given room for example. Then, the method which relies on an anticipation of future phenomena relies on a second temporal breakdown into periods of the future concerned.

Each period will advantageously represent a particular and stable situation of the use of the building, such as a certain occupancy. The future anticipation may advantageously extend over the next two or three days.

For the following description of the invention, each day will be considered to be broken down into K periods. The choice of a double breakdown in space and in time, i.e. the number of areas I and periods K, implemented by the method for managing the energy of a building, corresponds to an optimal trade-off between the accuracy of the calculations, which demands a breakdown into a large number of areas and instants, and the complexity and the weight of the resulting calculation which is all the simpler when the breakdown comprises few areas and instants.

Figure 1:
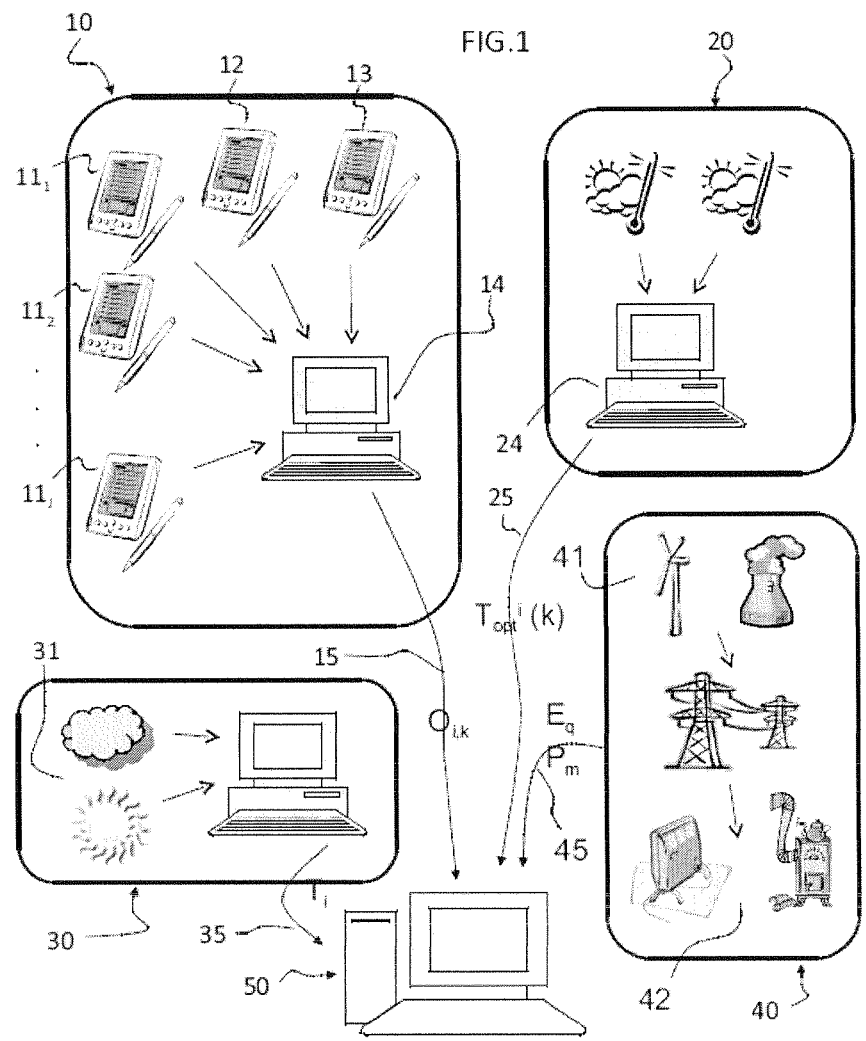

The method for managing the energy of a building will now be explained, according to a breakdown into blocks, to make it easier to describe it schematically, as represented in FIG. 1. The different blocks of this method may be implemented totally or partially by one and the same computer. A device for implementing the method will be detailed hereafter.

The method comprises a first block 10 for calculating an overall occupancy parameter of each area i of the building for each envisaged period k. The block 10 comprises as input the data from the different electronic diaries 11j of the J possible different occupants of the building. It also comprises the electronic diaries 12 of certain groups of occupants, and the diaries 13 of certain areas of the building. In practice, each individual has his or her own personal diary, but a group of individuals, such as a certain department of a company, may also have a diary for the group concerned as a whole, planning meetings for all or some of the members of the group. Furthermore, certain rooms of the building may also have a diary, such as the meeting rooms which have to be reserved in advance. The building occupancy block 10 compiles or merges these different data in a calculation block 14 to deduce therefrom as output 15 a parameter $O_{i,k}$ of global occupancy of an area i for a period k.

The input data from the diaries 11j, 12, 13 may come from any electronic diary, for example such as those used on personal computers using software like PIM or outlook or on a handheld electronic diary. These data may be transmitted to the merging block 14 by any communication means, for example via an internet or intranet link. The computer 14 may be a personal computer or a central server.

Each datum from the electronic diaries ultimately represents information concerning the presence or absence of an individual j in an area i for a period k, or an individual occupancy parameter $o_{i,j,k}$.

The following values should be set for this binary parameter:

$o_{i,j,k}=1$ if the individual j is present in the area i in the period k and 0 otherwise.

The merging means 14 for these data then implements the following calculation, to define the global occupancy parameter $O_{i,k}$ defined above.

$O_{i,k}=0$ if $\Sigma_{j=1}^{J} o_{i,j,k}=0$ or $O_{i,k}=1$ if $\Sigma_{j=1}^{J} o_{j,k}>0$ Thus, the occupancy parameter $O_{i,k}$ takes a value equal to 1 if there is at least one person in the area i during the period k and 0 if there is no person.

The management method also comprises a block 20 for calculating comfort data sought. For this, each individual j defines a desired maximum ambient temperature $T_{max}^{j}(k)$, a desired minimum ambient temperature $T_{min}^{j}(k)$ and a desired ideal ambient temperature $T_{opt}^{j}(k)$ for each period k. The block 20 compiles these different data from all the individuals present in one and the same area i at the same time to obtain a single common thermal comfort value for each area i and for each period k. For this, the block 20 comprises a calculation block 24 which performs the following calculations, to deduce therefrom a desired average maximum ambient temperature $T_{max}^{i}(k)$, a desired average minimum ambient temperature $T_{min}^{i}(k)$ and a desired average ideal ambient temperature $T_{opt}^{i}(k)$ for each area i and for each period k:

$$T_{max}^{i}(k) = \frac{\sum_{j=1}^{J} T_{max}^{j}(k) * o_{i,j,k}}{\sum_{i=1}^{J} o_{i,j,k}}$$

$$T_{min}^{i}(k) = \frac{\sum_{j=1}^{J} T_{min}^{j}(k) * o_{i,j,k}}{\sum_{i=1}^{J} o_{i,j,k}}$$

$$T_{opt}^{i}(k) = \frac{\sum_{j=1}^{J} T_{opt}^{j}(k) * o_{i,j,k}}{\sum_{i=1}^{J} o_{i,j,k}}$$

while observing the relationship: $T_{min}^{i}(k) \leq T_{opt}^{i}(k) \leq T_{max}^{i}(k)$ These equations involve producing the average of the temperatures desired by the different individuals present in an area i at an instant k. The data obtained are transmitted as output 25 of the block 20.

In the case where the method does not have any value entered by the individuals, default values may be predetermined and used, on the basis, for example, of the thermal comfort standard ISO7730.

Figure 2:
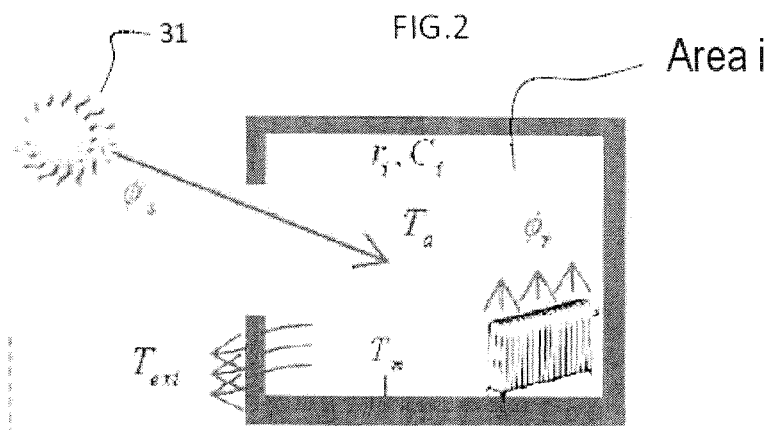
FIG. 2 illustrates the thermal modelling implemented for each area of a building according to the embodiment of the invention.

The method then uses a third block 30 for calculating temperatures in each area i for each period k. This calculation relies on a thermal behaviour model of each area of the building, schematically represented in FIG. 2. Advantageously, a second order model can be used to obtain the temperature of the air Ta (i, k) and the temperature of the jacket of the building $T_m$ (i, k) of the area i for the period k. This model includes as input weather forecasts 31, which make it possible to enter the outdoor temperature Text (k) for the period k and the solar radiant $\Phi s$ (k) affecting the area i for the period k. The weather data may be produced locally or obtained remotely via the Internet or any communication network. The model takes into account physical constants, including ri representing the volume thermal resistance of the air, rm representing the thermal resistance of the jacket of the building, Ci representing the volume thermal capacity of the air and Cm representing the thermal capacity of the jacket of the building. Finally, it takes into account the heating or cooling P involved inside the area i during the period k. The model used can be expressed by the following equation:

$$\begin{bmatrix} \frac{dTm}{dt} \\ \frac{dTa}{dt} \end{bmatrix} = \begin{bmatrix} \frac{-1}{riCm} & \frac{1}{riCm} \\ \frac{1}{riCm} & \frac{1}{raC1} - \frac{1}{riC1} \end{bmatrix} \begin{bmatrix} Tm \\ Ti \end{bmatrix} + \begin{bmatrix} 0 & 0 & 0 \\ \frac{1}{raCi} & \frac{1}{Ci} & \frac{W}{Ci} \end{bmatrix} \begin{bmatrix} \text{Text)} \\ P \\ \Phi_S \end{bmatrix}$$

This equation can give, more simply, the following equation, after discretization:

$$T_i(k+1) = A\, T_i(k) + B\, P_m(k) + C1\, \text{Text}(k) + C2\Phi s(k)$$

in which A, B, C1, and C2 are matrices characterizing the thermal behaviour of the building, $T_i(k)$ is the temperature of the area i for the period k, and $P_m(k)$ represents the energy injected by an appliance m in the period k.

This model can be used to calculate the forecast temperature of each area i in each period k based on the knowledge of the initial temperature and of the weather data. This value is transmitted as output 35 from the block 30. As a variant, any other thermal calculation model could be used.

The method has to determine the heating or the cooling needed in each area i and at each instant k to achieve the comfort criteria determined in the block 20 defined previously, by determining for each area i and each period k the optimum temperature setpoint, so as to achieve an optimum comfort for a minimum energy consumption, while observing the capacity constraints of the energy sources.

The management method comprises a fourth block 40 which comprises as input the data 41 from the Q possible energy sources $E_q$, linked to the building:

$E_q(k)$: represents the energy produced by a source q during the period k;

$E_q^{max}(k)$: represents the maximum energy that a source q can produce during the period k;

$\text{Cost}_q(k)$: represents the cost of an energy unit produced by the source q in the period k;

$CO_{2q}(k)$: represents the quantity of $CO_2$ discharged by an energy unit produced by the source q in the period k.

For each energy source, the method therefore takes into account all or some of the following data:
 the maximum production capacity in a period k;
 the cost of a consumption peak of the building;
 the quantity of $CO_2$ emitted from a unit of energy produced;
 the cost of production of an energy unit.

For example, for a photovoltaic production unit, the production capacity depends on the amount of sunlight and can be estimated in anticipation, based on the weather forecasts. If the building is simply linked to the national electricity network, the hourly tariff may be variable, include off-peak and peak times, which defines the cost for each period k considered.

The building can make use of the Q available energy sources for the operation of M appliances 42 present in the building, characterized by the following data:

$P_m(k)$: represents the energy injected by the appliance m in the period k;

$P_m^{max}(k)$: represents the maximum energy injected by the appliance m in the period k.

The various values considered by this block 40 are transmitted as output 45.

The values taken into account in the preceding blocks are finally used in a fifth block 50 which determines the different temperature setpoints for each area i and for the future periods k and the energies to be injected into the building to achieve these setpoints, in the most optimized way possible, for each area and for each period.

First, the block 50 defines the variable Si (k) defining the thermal sensation in an area i during a period k, that is to say, a variable representing the thermal comfort, using the following equations:

$$S_i(k) = \frac{T_{opt}^i(k) - Ti(k)}{T_{opt}^i(k) - T_{min}^i(k)} \text{ if } T_i(k) \leq T_{opt}^i(k)$$

or $$S_i(k) = \frac{-T_{opt}^i(k) + Ti(k)}{-T_{opt}^i(k) + T_{max}^i(k)} \text{ if } T_i(k) > T_{opt}^i(k)$$

These equations can be written by the following linear formulations:

$S_i(k) = a_2 T_i(k) + b_2$ if $T_i(k) \leq T_{opt}^i(k)$ or $S_i(k) = a_1 T_i(k) + b_1$ if $T_i(k) > T_{opt}^i(k)$ By using a binary variable $\delta_i(k)$ which takes the value equal to 1 if $T_i(k) \leq T_{opt}^i(k)$ and the value equal to 0 if $T_i(k) > T_{opt}^i(k)$, which can also be written in the following form:

$$T_i(k) - T_{opt}^i(k) \leq (T_{max}^i(k) - T_{opt}^i(k)) \times (1 - \delta_i(k))$$

and $T_i(k) - T_{opt}^i(k) \geq \epsilon - (-T_{min}^i(k) + T_{opt}^i(k) + \epsilon) \times \delta_1(k)$ then the two previous equations can be written more simply by:

$$S_i(k) = [1 - \delta_i(k)][a_1 T_i(k) + b_1] + \delta_i(k)[a_2 T(k) + b_2]$$

Then, the block 50 tries to achieve the following condition:

Minimize the following sum:

$$\sum_{i=1}^{I} \sum_{k=1}^{K} Si(k) O_{i,k} \qquad (1)$$

while observing the following equations (2) and (3) explained previously:

$$T_i(k+1) = A\, T_i(k) + B\, P_m(k) + C1\, \text{Text}(k) + C2\Phi s(k) \qquad (2)$$

$$S_i(k) = [1 - \delta_i(k)][a_1 T_i(k) + b_1] + \delta_i(k)[a_2 T_i(k) + b_2] \qquad (3)$$

The condition (1) makes it possible to obtain the optimum comfort for each area and for each period, by combining the global occupancy parameters $O_{i,k}$ and the thermal sensation or thermal comfort parameters Si (k), on the basis of their simple product in this embodiment. This makes it possible to take into account only the comfort for the occupied areas, based on the desires of the only occupants present.

In addition to the preceding thermal approach, the block 50 also tries to minimize the cost of the energy needed to achieve the desired optimum comfort. This is reflected in the search for the energy production $E_q(k)$ and energy consumption $P_m(k)$ values by the following operations:

Minimize:

$$\sum_{q=1}^{Q} \sum_{k=1}^{K} \text{Cost}_q(k) E_q(k) \qquad (4)$$

with $\sum_{m=1}^{M} P_m(k) = \sum_{q=1}^{Q} E_q(k) \qquad (5)$ and with $P_m(k) \leq P_m^{max}(k) \, \forall m \in [1,M] \, k \in [1,K] \qquad (6)$ and $E_q(k) \leq E_q^{max}(k) \, \forall q \in [1,Q], k \in [1,K] \qquad (7)$ The condition (4) makes it possible to minimize the cost of all the energy sources used by the building. The equation (5) represents the energy balance of the system as a whole, for which the energy consumed within the building corresponds to the energy produced for it to be consumed in the building. The last two conditions (6), (7), reflect available energy limits, because of the intrinsic limits of the devices concerned.

Finally, the block 50 can take into account other conditions such as one or more environmental conditions. In particular, it can minimize the $CO_2$ emitted into the atmosphere, or minimize the $CO_2$ emissions induced by the energy production $E_q$, which is reflected by the following condition (8):

Minimize the sum:

$$\Sigma_{q=1}^{Q} \Sigma_{k=1}^{K} CO_{2q}(k) E_q(k) \qquad (8)$$

The block 50 therefore comprises a computer, which may advantageously include a computer program, to find the solution that observes the above conditions and equations. For this, the Branch & Bound method can be applied.

As an example, consider a building with a single area for which the energy is to be scheduled over a period of 24 hours, by considering a sampling time of one hour.

The thermal model of this building is known and is written by the following equation:

$$\begin{bmatrix} T_1(k+1) \\ T_m(k+1) \end{bmatrix} = \begin{bmatrix} 0.299 & 0.686 \\ 0.203 & 0.794 \end{bmatrix} \begin{bmatrix} T_1(k) \\ T_m(k) \end{bmatrix} + \begin{bmatrix} 0.44 \\ 0.116 \end{bmatrix} P_m(k) + \begin{bmatrix} 0.015 \\ 0.004 \end{bmatrix} T_{ext}(k) + \begin{bmatrix} 0.44 \\ 0.116 \end{bmatrix} \Phi_S(k)$$

The single area of the building is assumed to be occupied from 6 pm to 6 am. Thus, the global occupancy parameter is expressed by the following parameter:
$O_{1,k}$=[1, 1, 1, 1, 1, 1, 1, 0, 0, 0, 0, 0, 0, 0, 0, 0, 0, 1, 1, 1, 1, 1, 1]

The thermal sensation criterion is defined by:
$T_{min}$=18° C.; $T_{opt}$=22° C.; $T_{max}$=26° C.

The thermal sensation variable is written:

$$S1(k) = \begin{cases} \frac{-1}{4} T_1(k) + \frac{11}{2} & \text{if } T_1(k) \le 22 \\ \frac{1}{4} T_1(k) + \frac{11}{2} & \text{if } T_1(k) > 22 \end{cases}$$

The building concerned is linked to the electricity network for which the production cost varies according to the off-peak or peak tariff. The maximum power of the energy source is 2 kW.

The following applies:

$$\text{Cost}(k) = \begin{cases} 0.1106 & \text{if } k \subset [1, 2] \cup [7, 11] \cup [15, 24] \\ 0.0673 & \text{if } k \in [3, 6] \cup [12, 14] \end{cases}$$

Figure 3:
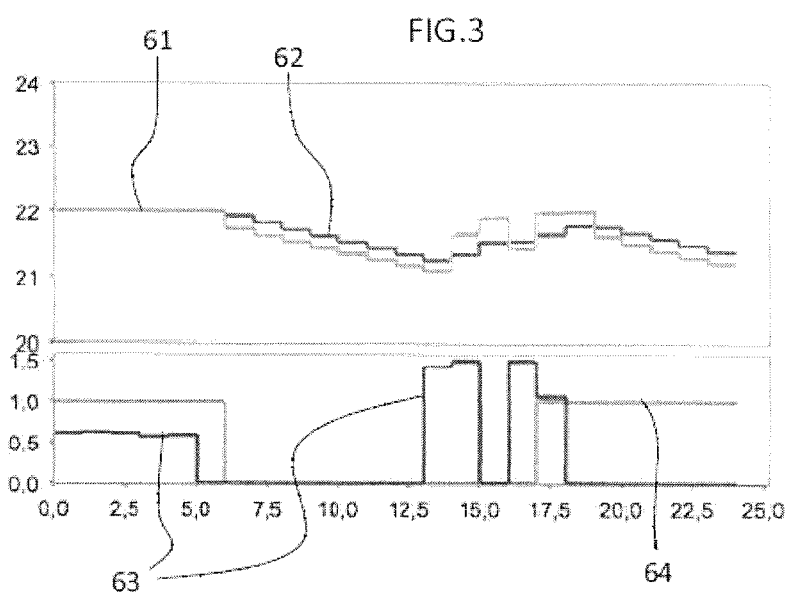
FIG. 3 represents the result obtained according to an exemplary implementation of the method for managing the energy of a building according to the embodiment of the invention.

The embodiment of the invention searches for the values of $T_1(k)$ and $P_1(k)$ for any k, so as to minimize:
the comfort criterion $\Sigma_{k=1}^{24} S_1(k) O_{1,k}$
and the energy cost criterion $\Sigma_{k=1}^{24} \text{Cost}(k) E(k)$ FIG. 3 illustrates the result obtained for this example, for which a first curve 61 illustrates the variation of the setpoint temperature as a function of time, a second curve 62 the variation of the temperature inside the building. These temperatures are associated with a curve 64 representing the occupancy of the building, and with a curve 63 representing the energy consumption of the building. It will be noted that the heating consumes energy during an off-peak period, before the occupancy of the building, which makes it possible to obtain the comfort temperature at the time of occupancy together with a minimized energy expenditure. This deliberately simple example illustrates the optimized result obtained by the invention, which can be reproduced on large buildings, comprising a large number of areas and potential occupants.

The embodiment described previously for managing the energy of the residence primarily detailed the management of the heating and of air conditioning, in order to obtain a desired thermal comfort, mainly through the management of the indoor temperature in each area of the building, since, as explained in the preamble, the heating and air conditioning systems represent a major proportion of the overall energy consumed. However, the energy management method as described previously is adapted to take into account any device consuming energy within a building.

For example, the method also manages the light and determines which light sources should be switched on and at what times in the building to achieve an optimum trade-off between the overall desire for light of the occupants, based on their individual desires, by taking into account weather data and the outdoor light. The method described previously therefore also applies similarly for the management of the lighting within the building. Similarly, more generally, the energy management method can be applied to optimizing the global energy consumption of the building, by taking into account all the energy-consuming devices, all the desires associated with the occupants to deduce therefrom an overall comfort value, all the outdoor conditions, and so on.

Furthermore, the preceding method has been explained as an example and can be implemented with multiple variants.

For example, the block 10 for determining the global occupancy parameter of the building can use as input an electronic diary, a holiday diary from another independent holiday management source, via an intranet, or obtain the presence data from one or more presence sensors.

The overall energy management of the building has been described on the basis of three main criteria: the comfort of the occupants, the cost or energy efficiency, and the ecological criterion with minimization of the $CO_2$ emitted. A fourth criterion of autonomy of the building in case of an electricity network outage can be envisaged.

However, it should be clearly noted that the invention is not limited to necessarily searching for all the criteria mentioned above. It already makes it possible to achieve highly advantageous effects on the basis of just one of these criteria, in particular the comfort of the occupants. Then, all combinations of these different criteria with the criterion of the comfort of the occupants can be envisaged, representing miscellaneous variants of the energy management method.

The method for managing the energy of a building described above can be implemented with different devices.

However, an advantageous embodiment relies on the use of a smart device 70, fulfilling an intermediate management function in the management of the different energy systems such as the heating and the air conditioning, by implementing all or some of the method described previously, generally in a way combined with at least one computer which executes the most complex calculations of the method to transmit results and commands to the smart device. The main commands managed by the device are the determination of the temperature setpoint of the heating and/or the air conditioning, the modification of the lighting in the different areas, the setting of the computer equipment to standby, the activation or the deactivation of the electrical appliances. One advantage of such an approach is that it makes it possible to implement the energy management method described previously with the addition of minimal extra hardware within the building, which is limited to a small-sized smart device, such as the one described below, a computer of the building being used to implement a part of the method through a computer program.

Figure 4:
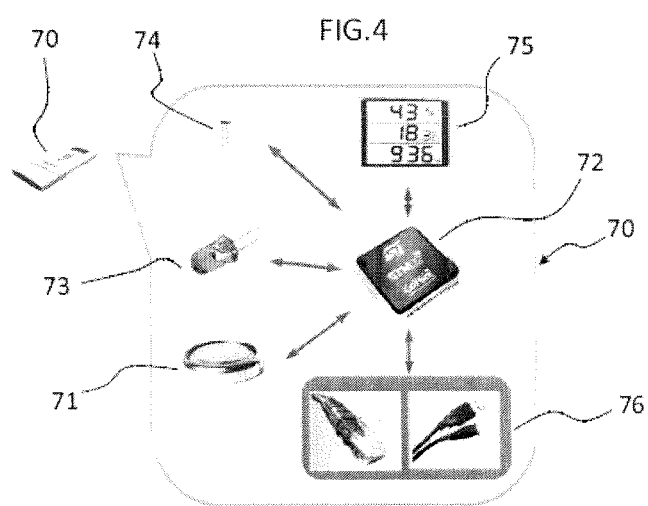
FIG. 4 represents a first embodiment of a device for implementing the method for managing the energy of a building according to the invention.

According to a first embodiment, the smart device takes the form of a universal remote control, as represented in FIG. 4, which communicates by any contactless means, such as infrared, radio, etc., with the different systems of the building. For this, the remote control 70 includes a computer such as a microprocessor 72, or any hardware and/or software device suitable for implementing the method of the invention. It operates independently with a battery 71, comprises an infrared emitter 73 for its infrared communications, comprises a temperature sensor 74 and a display 75. It is also linked to the communication network 76 of the building which allows it access with a central computer and devices to be controlled such as the heating or the air conditioning.

Figure 5:
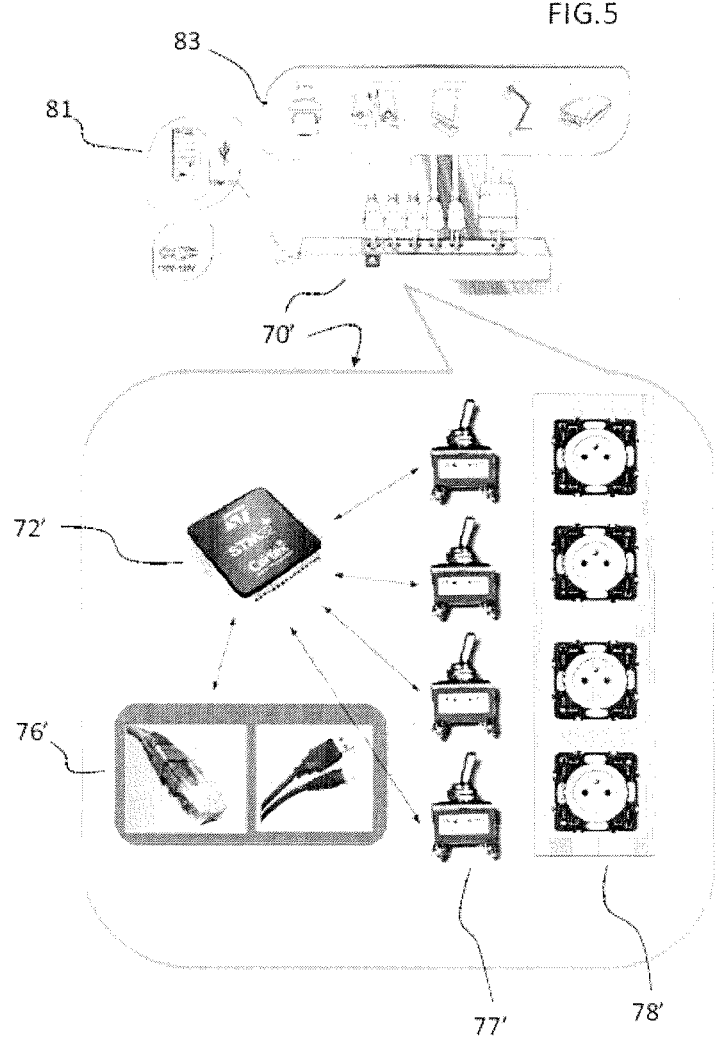
FIG. 5 represents a second embodiment of a device for implementing the method for managing the energy of a building according to the invention.

According to a second embodiment, the smart device 70', illustrated in FIG. 5, takes the form of a communicating electricity outlet, of the multiway type, which can incorporate components similar to those described above in the remote control form, such as a microprocessor 72' and a connection 76', as well as switches 77' for activating or deactivating the outlets 78' to which the various electrical appliances of the building are connected, such as a central computer 81, printers, screens, lamps, etc., 83. In this form, the smart device fulfils the additional function of connecting or not connecting the various devices to the electricity network. This makes it possible to minimize the electricity consumption of the building, by disconnecting the appliances that are not needed. This also makes it possible to avoid setting the electrical appliances to standby and to obtain savings in electricity consumption. Furthermore, the smart device 70' can also automatically detect the various appliances that are connected to it, for example by measuring and differentiating the power consumed by each of them.

According to a third embodiment envisaged, the smart device may consist of a communicating inverter.

In all cases, the smart device may have a connection of Ethernet, Bluetooth, ZigBee, USB, RS232, or similar type, for its connection with, for example, a computer which manages the data necessary to the management method described previously and shares the implementation of this method with the smart device.

The smart device is preferably independent energy-wise, using a battery, and capable of managing the building even without any link with a central computer, for example at night when the latter is switched off, on the basis of stored data, pending refreshed data at the time of a new communication with such a central computer. This makes it possible to reduce the overall energy consumption of the building, since the smart device, of low consumption, can be enough to manage the building during certain periods. There is no obligation to leave devices with high energy consumption operating permanently.

Thus, the smart device can be linked to the electricity network when it is in contact with a central computer that is in operation, the latter scheduling the future energy commands for the building on the basis of the method described previously and transmitting these future commands, which may relate to a period of several days, for example two to three days, to the smart device which controls the building on the basis of these commands. The device is then able to control the building independently over a certain period when the computer is switched off, on the basis of the stored commands. When the computer is switched on again, it resumes the calculations and can update the command data on the smart device.

Figure 6:
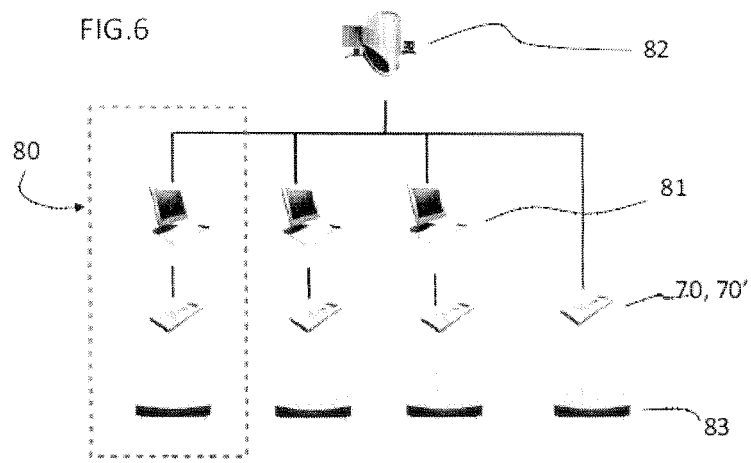
FIG. 6 represents a variant of the embodiments of devices for implementing the method for managing the energy of a building according to the invention.

In the case of a building comprising a number of areas as illustrated in FIG. 6, each area 80 may comprise a computer 81 and a smart device, 70, 70' to control the energy systems 83 of the area like the heating and the air conditioning, independently. According to an advantageous embodiment, a central server 82 can be linked to all the computers 81 of each area to monitor and centralize all the data from each area.

The concept of the invention is suited to any building extending in the broadest sense, from a simple caravan to a building of large dimensions, for use in a residence or for an industrial use.

The invention claimed is:

1. A method for managing an energy system of a building, comprising one or more occupants to be present in an area (i) of the building, each occupant determining a desired ambient temperature for a given period (k), wherein the method comprises a step for determining a global thermal comfort criteria including an overall thermal sensation value Si (k) in area (i) for period (k), this value being defined from the desired ambient temperature of each occupant present in the building in the area (i) for period (k), and in that the method comprises a determination of heating or cooling in each area (i) for each period (k) in order to achieve the comfort criteria, based on meteorological forecasts for each period (k), using a thermal behaviour model of each area (i) of the building to link a temperature ($T_i$ (k+1)) of an area (i) for a period (k+1) to a temperature ($T_i$ (k)) of the area (i) in a preceding period (k), according to thermal constants of the building, of an energy ($P_m$ (k)) supplied by an appliance during the period (k), of an outdoor temperature (Text (k)) in the period (k), of solar radiant ($\Phi s$ (k)) affecting the area (i) for the period (k), by the following equation:

$$T_i(k+1)=A\ T_i(k)+B\ P_m(k)+C1\ \text{Text}(k)+C2\Phi s(k)$$

in which A, B, C1 and C2 are matrices of the thermal behaviour of the building, a step for determining a binary global occupancy parameter ($O_{i,k}$), representing presence or absence of at least one occupant in an area (i) of the building for a given period (k), which takes a zero value when absence and is equal to one when there is at least one occupant, and in that it takes into account a product of the global occupancy parameter ($O_{i,k}$) by the global comfort parameter for the management of the energy of the building based on the desired ambient temperature of the at least one occupant present in the area of the building concerned during the period (k), and adjusting the energy system of the building using the determined global thermal comfort criteria and the determined binary global occupancy parameter ($O_{i,k}$).

2. A method for managing an energy system of a building, comprising one or more occupants to be present in an area (i) of the building, each occupant determining a desired ambient temperature for a given period (k), wherein the method comprises a step for determining a global thermal comfort criteria including an overall thermal sensation value Si (k) in area (i) for period (k), this value being defined from the desired ambient temperature of each occupant present in the building in the area (i) for period (k), and in that the method comprises a determination of heating or cooling in each area (i) for each period (k) in order to achieve the comfort criteria, based on meteorological forecasts for each period (k), using a thermal behaviour model of each area (i) of the building to link a temperature ($T_i$ (k+1)) of an area (i) for a period (k+1) to a temperature ($T_i$ (k)) of the area (i) in a preceding period (k), according to thermal constants of the building, of an energy ($P_m$ (k)) supplied by an appliance during the period (k), of an outdoor temperature (Text (k)) in the period (k), of solar radiant ($\Phi s$ (k)) affecting the area (i) for the period (k), by the following equation:

$$T_i(k+1) = A\ T_i(k) + B\ P_m(k) + C1\ \text{Text}(k) + C2\Phi s(k)$$

in which A, B, C1 and C2 are matrices of the thermal behaviour of the building, wherein the step for determining an overall thermal sensation value Si (k) for a given period (k) comprises the determination for each potential occupant (j) of a desired maximum ambient temperature ($T_{max}^j$ (k)), of a desired minimum ambient temperature ($T_{min}^j$ (k)) and of a desired ideal ambient temperature ($T_{opt}^j$ (k)) for each period k, and in that it comprises a calculation of a desired average maximum ambient temperature ($T_{max}^i$ (k)), of a desired average minimum ambient temperature ($T_{min}^i$ (k)) and of a desired average ideal ambient temperature ($T_{opt}^i$ (k)) for each area (i) of the building and for each period (k) according to the following equations:

$$T_{max}^i(k) = \frac{\sum_{j=1}^{J} T_{max}^j(k) * o_{i,j,k}}{\sum_{i=1}^{J} o_{i,j,k}}$$

$$T_{min}^i(k) = \frac{\sum_{j=1}^{J} T_{min}^j(k) * o_{i,j,k}}{\sum_{i=1}^{J} o_{i,j,k}}$$

$$T_{opt}^i(k) = \frac{\sum_{j=1}^{J} T_{opt}^j(k) * o_{i,j,k}}{\sum_{i=1}^{J} o_{i,j,k}}$$

and in that it comprises the calculation of the global thermal sensation value $S_i$ (k) for each area (i) of the building and for each period (k) by the following equations:

$$S_i(k) = \frac{T_{opt}^i(k) - T_i(k)}{T_{opt}^i(k) - T_{min}^i(k)} \text{ if } T_i(k) \leq T_{opt}^i(k)$$

or $$S_i(k) = \frac{-T_{opt}^i(k) + T_i(k)}{-T_{opt}^i(k) + T_{max}^i(k)} \text{ if } T_i(k) > T_{opt}^i(k)$$

adjusting the energy system of the building using the determined global thermal comfort criteria.

3. The method for managing the energy system of a building according to claim 2, wherein the management of the energy of an area (k) of the building comprises the minimization of the following sum:

$$\Sigma_{i=1}^{I} \Sigma_{k=1}^{K} Si(k) O_{i,k}.$$

4. A method for managing an energy system of a building, comprising one or more occupants to be present in an area (i) of the building, each occupant determining a desired ambient temperature for a given period (k), wherein the method comprises a step for determining a global thermal comfort criteria including an overall thermal sensation value Si (k) in area (i) for period (k), this value being defined from the desired ambient temperature of each occupant present in the building in the area (i) for period (k), and in that the method comprises a determination of heating or cooling in each area (i) for each period (k) in order to achieve the comfort criteria, based on meteorological forecasts for each period (k), using a thermal behaviour model of each area (i) of the building to link a temperature ($T_i$ (k+1)) of an area (i) for a period (k+1) to a temperature ($T_i$ (k)) of the area (i) in a preceding period (k), according to thermal constants of the building, of an energy ($P_m$ (k)) supplied by an appliance during the period (k), of an outdoor temperature (Text (k)) in the period (k), of solar radiant ($\Phi s$ (k)) affecting the area (i) for the period (k), by the following equation:

$$T_i(k+1) = A\ T_i(k) + B\ P_m(k) + C1\ \text{Text}(k) + C2\Phi s(k)$$

in which A, B, C1 and C2 are matrices of the thermal behaviour of the building, wherein the method considers energy produced ($E_q$ (k)) for a period (k) by one energy source (q) out of Q possible different energy sources, linked to the building, and the operation of one appliance (m) consuming energy ($P_m$ (k)) for the period (k) out of the M appliances present in the building, and in that it seeks to optimize the energy consumption of the building by minimizing the sum $$\Sigma_{q=1}^{Q} \Sigma_{k=1}^{K} \text{Cost}_q(k) E_q(k)$$

in which $\text{Cost}_q$ (k) represents the cost of an energy unit produced by a source (q) in the period (k);

and in that it checks the following energy balance:

$$\sum_{m=1}^{M} P_m(k) = \sum_{q=1}^{Q} E_q(k)$$

and adjusting the energy system of the building using the determined global thermal comfort criteria.

5. The method for managing the energy system of a building according to claim 4, wherein it takes into account a maximum ($E_q^{max}$ (k)) of the energy produced by a source (q) during a period (k) and a maximum ($P_m^{max}$ (k)) of the energy injected by the appliance (m) during the period (k), by checking the following conditions:

$$P_m(k) \leq P_m^{max}(k) \forall m \in [1,M], k \in [1,K]$$

and $E_q(k) \leq E_q^{max}(k) \forall q \in [1,Q], k \in [1,K].$

6. The method for managing the energy system of a building according to claim 4, wherein it considers the minimization of the $CO_2q$ (k) emissions by a source of energy production (q) during a period (k), by minimizing the sum $$E_{q=1}{}^Q \Sigma_{k=1}{}^K CO_{2q}(k)E_q(k).$$

7. A device for managing the energy system of a building, comprising one or more occupants to be present in an area (i) of the building, each determining a desired ambient temperature for a given period, comprising appliances consuming energy, wherein it comprises a means implementing a method for managing the energy of a building according to claim 1.

8. The device for managing the energy system of a building according to claim 7, wherein the means implementing the method for managing the energy of the building comprises on the one hand a calculator of a computer, which performs calculations of the method, and on the other hand a smart device (70, 70'), linked to the computer by a communication means, which receives results from the computer and transmits control commands to at least one energy consuming appliance inside the building.

9. The device for managing the energy system of a building according to claim 8, wherein the smart device (70, 70') is a remote control, a communicating outlet or a communicating inverter.

10. The device for managing the energy system of a building according to claim 7, wherein the means implementing the method for managing the energy of the building is linked to one or more electronic diaries of potential occupants, or groups of occupants, or of areas of the building, or to at least one presence sensor, so as to be able to deduce therefrom the global occupancy parameter of the building.

11. A building, which comprises a device for managing its energy system which implements a management method according to claim 1.

12. The building according to claim 11, wherein it comprises a number of areas (80) each of which comprises a device for managing its energy, independent or linked by a central server (82).

13. The method for managing the energy system of a building according to claim 1, wherein the step for determining an overall thermal sensation value Si (k) for a given period (k) comprises the determination for each potential occupant (j) of a desired maximum ambient temperature ($T_{max}^j$ (k)), of a desired minimum ambient temperature ($T_{min}^j$ (k)) and of a desired ideal ambient temperature ($T_{opt}^j$ (k)) for each period k, and in that it comprises a calculation of a desired average maximum ambient temperature ($T_{max}^i$ (k)), of a desired average minimum ambient temperature ($T_{min}^i$ (k)) and of a desired average ideal ambient temperature ($T_{opt}^i$ (k)) for each area (i) of the building and for each period (k) according to the following equations:

$$T_{max}^i(k) = \frac{\sum_{j=1}^{J} T_{max}^j(k) * o_{i,j,k}}{\sum_{j=1}^{J} o_{i,j,k}}$$

$$T_{min}^i(k) = \frac{\sum_{j=1}^{J} T_{min}^j(k) * o_{i,j,k}}{\sum_{j=1}^{J} o_{i,j,k}}$$

$$T_{opt}^i(k) = \frac{\sum_{j=1}^{J} T_{opt}^j(k) * o_{i,j,k}}{\sum_{j=1}^{J} o_{i,j,k}}$$

and in that it comprises the calculation of the global thermal sensation value $S_i$ (k) for each area (i) of the building and for each period (k) by the following equations:

$$S_i(k) = \frac{T_{opt}^i(k) - Ti(k)}{T_{opt}^i(k) - T_{min}^i(k)} \text{ if } T_i(k) \leq T_{opt}^i(k)$$

or $$S_i(k) = \frac{-T_{opt}^i(k) + Ti(k)}{-T_{opt}^i(k) + T_{max}^i(k)} \text{ if } T_i(k) > T_{opt}^i(k).$$

14. The method for managing the energy system of a building according to claim 5, wherein it considers the minimization of the $CO_2q$ (k) emissions by a source of energy production (q) during a period (k), by minimizing the sum $$\Sigma_{q=1}{}^Q \Sigma_{k=1}{}^K CO_{2q}(k)E_q(k).$$

15. The device for managing the energy system of a building according to claim 8, wherein the means implementing the method for managing the energy of the building is linked to one or more electronic diaries of potential occupants, or groups of occupants, or of areas of the building, or to at least one presence sensor, so as to be able to deduce therefrom the global occupancy parameter of the building.

16. The device for managing the energy system of a building according to claim 9, wherein the means implementing the method for managing the energy of the building is linked to one or more electronic diaries of potential occupants, or groups of occupants, or of areas of the building, or to at least one presence sensor, so as to be able to deduce therefrom the global occupancy parameter of the building.

* * * * *